(12) United States Patent
Bennett et al.

(10) Patent No.: US 10,001,597 B2
(45) Date of Patent: Jun. 19, 2018

(54) MULTICORE OPTICAL FIBERS AND INTERCONNECTION METHODS FOR THE SAME

(71) Applicant: CORNING INCORPORATED, Corning, NY (US)

(72) Inventors: Kevin Wallace Bennett, Hammondsport, NY (US); Douglas Llewellyn Butler, Painted Post, NY (US); Ming-Jun Li, Horseheads, NY (US); Robert Adam Modavis, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days. days.

(21) Appl. No.: 15/253,066

(22) Filed: Aug. 31, 2016

(65) Prior Publication Data
US 2017/0082797 A1 Mar. 23, 2017

Related U.S. Application Data

(60) Provisional application No. 62/221,908, filed on Sep. 22, 2015.

(51) Int. Cl.
G02B 6/02 (2006.01)
G02B 6/028 (2006.01)
(52) U.S. Cl.
CPC ....... *G02B 6/02042* (2013.01); *G02B 6/0281* (2013.01)
(58) Field of Classification Search
USPC ........................................................ 385/123
See application file for complete search history.

(56) References Cited

U.S. PATENT DOCUMENTS

| 4,444,463 A | 4/1984 | Schneider et al. |
| 4,690,500 A * | 9/1987 | Hayami .................. G02B 6/06 385/116 |
| 4,755,021 A | 7/1988 | Dyott |
| 5,519,801 A | 5/1996 | Le Noane et al. |

(Continued)

FOREIGN PATENT DOCUMENTS

| CN | 201820023 U | 5/2011 |
| EP | 703475 A1 | 3/1996 |

(Continued)

OTHER PUBLICATIONS

Klaus, W., et al., "Free-Space Coupling Optics for Multicore Fibers", IEEE Photonics Technology Letters, vol. 24, No. 21, pp. 1902-1905, Nov. 1, 2012.

(Continued)

*Primary Examiner* — Eric Wong
(74) *Attorney, Agent, or Firm* — John P. Ciccarelli

(57) ABSTRACT

A multicore optical fiber that includes seventeen cores arranged in a hexagonally close-packed configuration, each core having a core center and comprising silica and an up-dopant; and a cladding region surrounding the seventeen cores, the cladding region having a cladding edge, an outer diameter, and a cladding composition comprising silica. The outer diameter of the cladding region is between about 100 microns and 150 microns. Further, the hexagonally close-packed configuration has bi-lateral symmetry to accommodate bi-directional data flow within the fiber.

18 Claims, 7 Drawing Sheets

(56) References Cited

U.S. PATENT DOCUMENTS

| | | | |
|---|---|---|---|
| 5,608,827 | A | 3/1997 | Boscher et al. |
| 5,729,966 | A | 3/1998 | Grulick |
| 5,748,820 | A | 5/1998 | Le Marer et al. |
| 5,904,037 | A | 5/1999 | Grulick et al. |
| 6,049,646 | A | 4/2000 | Boscher |
| 6,089,044 | A | 7/2000 | Hardy et al. |
| 6,106,368 | A | 8/2000 | Childers et al. |
| 6,154,594 | A | 11/2000 | Fiacco et al. |
| 6,293,081 | B1 | 9/2001 | Grulick et al. |
| 6,539,151 | B2 | 3/2003 | Fajardo et al. |
| 7,900,481 | B2 | 3/2011 | Gallagher et al. |
| 8,433,166 | B2 | 4/2013 | Nagashima et al. |
| 8,737,792 | B2 | 5/2014 | Fini et al. |
| 2008/0018989 | A1 | 1/2008 | Tanigawa et al. |
| 2008/0282742 | A1 | 11/2008 | Colgan et al. |
| 2009/0154503 | A1 | 6/2009 | Peyghambarian et al. |
| 2010/0290750 | A1 | 11/2010 | Imamura |
| 2011/0088433 | A1* | 4/2011 | Allegretto ............ G01M 11/00 65/378 |
| 2011/0129190 | A1 | 6/2011 | Fini et al. |
| 2011/0229085 | A1 | 9/2011 | Bradley et al. |
| 2011/0229086 | A1 | 9/2011 | Bradley et al. |
| 2011/0243517 | A1* | 10/2011 | Kokubun ........... G02B 6/02042 385/123 |
| 2012/0219255 | A1 | 8/2012 | Bradley et al. |
| 2013/0044978 | A1 | 2/2013 | DeDobbelaere et al. |
| 2013/0128730 | A1 | 5/2013 | Chion et al. |
| 2013/0129292 | A1 | 5/2013 | Sasaoka et al. |
| 2013/0170804 | A1 | 7/2013 | Hayashi |
| 2013/0177273 | A1 | 7/2013 | Alfano et al. |
| 2013/0216184 | A1 | 8/2013 | Kopp et al. |
| 2013/0301991 | A1 | 11/2013 | Kopp et al. |
| 2013/0322835 | A1 | 12/2013 | Butler et al. |
| 2014/0003779 | A1 | 1/2014 | Arakawa et al. |
| 2014/0233893 | A1 | 8/2014 | Mei et al. |
| 2014/0241712 | A1 | 8/2014 | Sugawara et al. |
| 2015/0147025 | A1 | 5/2015 | Westbrook |
| 2015/0212274 | A1* | 7/2015 | Kopp .................... G02B 6/30 385/43 |
| 2016/0223774 | A1 | 8/2016 | Bennett et al. |
| 2016/0259136 | A1* | 9/2016 | Rondeau ................ G02B 6/06 |
| 2016/0349447 | A1 | 12/2016 | Butler et al. |

FOREIGN PATENT DOCUMENTS

| | | |
|---|---|---|
| JP | 60154205 A | 8/1985 |
| JP | 2011-158768 A | 8/2011 |
| WO | 1992004719 A1 | 3/1992 |
| WO | 2000016131 A2 | 3/2000 |

OTHER PUBLICATIONS

Matsuo, S., et al., "12-core fiber with one ring structure for extremely large capacity transmission", Optics Express, vol. 20, No. 27, pp. 28398-28408, Dec. 6, 2012.

Presby, H., "Ultraviolet-excited fluorescence in optical fibers and preforms", Applied Optics, vol. 20, No. 4, pp. 701-706, Feb. 15, 1981.

Sano, A., et al., "Crosstalk-Managed High Capacity Long Haul Mulitcore Fiber Transmission With Propagation-Direction Interleaving", Journal of Lightwave Technology, vol. 32, No. 16, pp. 2771-2779, Aug. 15, 2014.

Zhu, B., et al., "Seven-core multicore fiber transmissions for passive optical network", Optics Express, vol. 18, No. 11, pp. 11117-11122, May 11, 2010.

* cited by examiner

MULTICORE OPTICAL FIBERS AND INTERCONNECTION METHODS FOR THE SAME

This application claims the benefit of priority under 35 U.S.C. § 119 of U.S. Provisional Application Ser. No. 62/221,908 filed on Sep. 22, 2015 the content of which is relied upon and incorporated herein by reference in its entirety.

TECHNICAL FIELD

The present disclosure relates generally to multicore optical fibers having a plurality of cores within a cladding. More particularly, embodiments described herein relate to multicore optical fibers having a plurality of cores with a close-packed core configuration having bi-lateral symmetry to accommodate bi-directional data flow within the fiber.

BACKGROUND

Optical fibers are subject to increasing bandwidth demands placed by data centers and high-performance computers. Many of these applications and devices require increasing data transmission rates through constant or constricted fiber geometries. In particular, bandwidth density is at a premium in many applications including but not limited to data centers, front panels, opto-electronic chips and packages, between data center shelves and in fiber raceways.

In general, it is understood that bandwidth density can be improved in fiber optic communication systems in at least three ways. For example, the bit rate of the signal being transmitted through the fiber can be increased. Another approach is to increase the number of signal wavelengths being carried in each optical core or pathway within a given fiber, e.g., wavelength division multiplexing (WDM). A third approach is to increase the number of pathways per unit area within the fiber, e.g., spatial division multiplexing (SDM). In general, each of the foregoing approaches can be used alone or in combination to improve bandwidth intensity. When these approaches are combined, the improvements realized in bandwidth density can be multiplicative.

Some recent developments have related to increases in the bit rate of signals. However, these increases have not been realized at a pace necessary to meet recent demands for increases in optical fiber bandwidth density. Recent WDM developments offer some promise, but significant increases in bandwidth intensity have yet to be realized with this approach. Some advancement in bandwidth density has been realized through SDM approaches employing multiple spatial modes in multimode and few-moded fibers, but interconnections have been costly.

There accordingly remains a need for optical fiber technologies that provide increases in bandwidth density. Preferably, these technologies can accomplish the increases in bandwidth density without significant increases in cost and/or other drawbacks. It is to the provision of such optical fiber technologies that the present disclosure is directed.

BRIEF SUMMARY

Described herein are various multicore optical fibers that possess a plurality of cores with a core packing configuration that exhibits bi-lateral symmetry to accommodate bi-directional data transmission.

According to an embodiment of the present disclosure, a multicore optical fiber is provided that includes seventeen cores arranged in a hexagonally close-packed configuration, each core having a core center and comprising silica and an up-dopant; and a cladding region surrounding the seventeen cores, the cladding region having a cladding edge, an outer diameter, and a cladding composition comprising silica. The outer diameter of the cladding region is between about 100 microns and 150 microns. Further, the hexagonally close-packed configuration has bi-lateral symmetry to accommodate bi-directional data flow within the fiber.

According to an embodiment of the present disclosure, a multicore optical fiber is provided that includes a plurality of cores having a close-packed configuration, each core having a core center and comprising silica and an up-dopant; and a cladding region surrounding the plurality of cores, the cladding region having a cladding edge, an outer diameter and a cladding composition comprising silica. The cladding edge comprises an angular indication feature, the indication feature being aligned to a line of bi-lateral symmetry between the cores and being configured to facilitate alignment of a connector to the fiber. Further, the close-packed configuration has bi-lateral core symmetry to accommodate bi-directional data flow within the fiber.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments. Directional terms as used herein—for example, up, down, right, left, front, back, top, bottom—are made only with reference to the figures as drawn and are not intended to imply absolute orientation.

Figure 1:
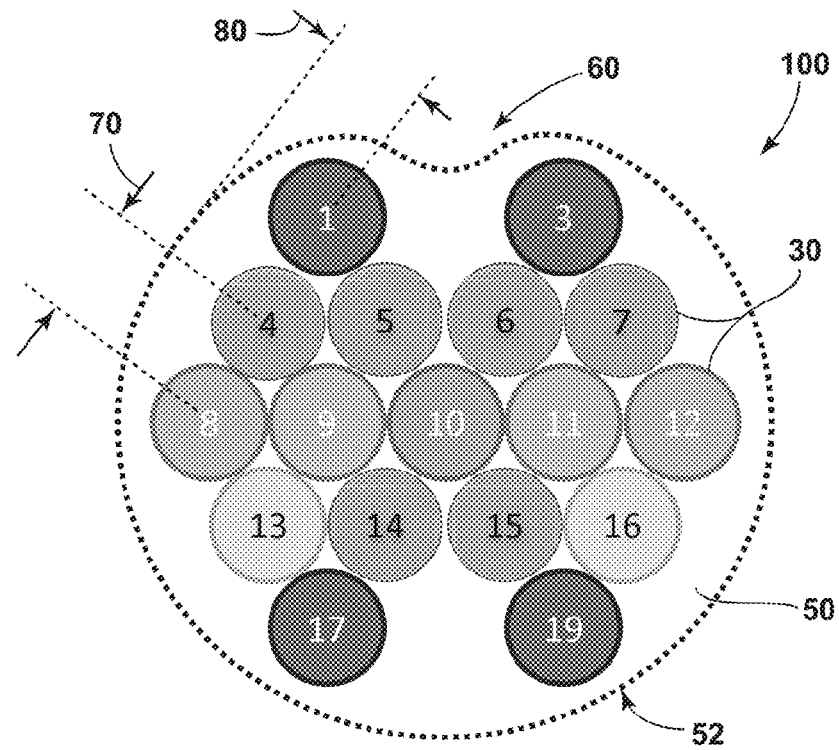
FIG. 1 is a cross-sectional schematic of a multicore, seventeen-core optical fiber according to an embodiment of the disclosure.

These and other embodiments, advantages, and salient features will become apparent from the following detailed description, the accompanying drawings, and the appended claims.

DETAILED DESCRIPTION

Reference will now be made in detail to the present embodiments, examples of which are illustrated in the accompanying drawings. Whenever possible, the same reference numerals will be used throughout the drawings to refer to the same or like parts. Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The "refractive index profile" is the relationship between refractive index or relative refractive index and waveguide fiber radius.

The "relative refractive index percent" is defined as $\Delta\% = 100 \times (n_i^2 - n_{REF}^2)/2n_i^2$, where $n_i$ is the maximum refractive index in region i, unless otherwise specified. The relative refractive index percent is measured at 850 nm unless otherwise specified. Unless otherwise specified herein, $n_{REF}$ is the refractive index of undoped silica glass, i.e. 1.4525 at 850 nm.

As used herein, the relative refractive index is represented by $\Delta$ and its values are given in units of "%," unless otherwise specified. In cases where the refractive index of a region is less than the reference index $n_{REF}$, the relative index percent is negative and is referred to as having a "depressed region" or "depressed index," and the minimum relative refractive index is calculated at the point at which the relative index is most negative unless otherwise specified. In cases where the refractive index of a region is greater than the reference index $n_{REF}$, the relative index percent is positive and the region can be said to be "raised" or to have a "positive index".

As also used herein, an "up-dopant" is considered to be a dopant which has a propensity to raise the refractive index relative to pure un-doped $SiO_2$. Example up-dopants that may be used according to some embodiments include $GeO_2$, $Al_2O_3$ and $P_2O_5$. A "down-dopant" is considered to be a dopant which has a propensity to lower the refractive index relative to pure un-doped $SiO_2$. Example down-dopants that may be used according to some embodiments include fluorine and boron. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

As further used herein, the terms "graded index profile," "alpha profile" and "α-profile" refer to a relative refractive index profile, expressed as $\Delta(r)$ in units of "%," where r is the radial location within the MCF, as given by Equation (1):

$$\Delta(r) = \Delta(r_o)(1 - [|r - r_o|/(r_1 - r_o)]^\alpha) \qquad (1)$$

where $r_o$ is zero unless otherwise specified, $r_1$ is the point which $\Delta(r)$ has its minimum value, and r is in the range of $r_i \leq r \leq r_f$, A is defined as above, $r_i$ is the initial point of the α-profile, $r_f$ is the final point of the α-profile, and a is an exponent which is a positive real number.

Provided herein are various multicore optical fibers that possess a plurality of cores with a core packing configuration that exhibits bi-lateral symmetry to accommodate bi-directional data transmission. In embodiments of the present disclosure, the multicore optical fibers (MCFs) of the disclosure can increase bandwidth density through spatial division multiplexing (SDM). These fibers can also reduce overall system cost by facilitating the use of lower cost connectors and methods for coupling the connectors to these fibers.

Referring to FIG. 1, a multicore optical fiber 100 is provided that includes a plurality of cores 30 having a close-packed configuration. Each core 30 includes a core center and a composition comprising silica and an up-dopant. Further, the fiber 100 includes a cladding region 50 surrounding the plurality of cores 30. The cladding region 50 includes a cladding edge 52, an outer diameter and a cladding composition comprising silica. The cladding edge 52 comprises an angular indication feature 60. In particular the indication feature 60 is configured to facilitate alignment of a connector to the fiber 100. Further, the close-packed configuration has bi-lateral core symmetry to accommodate bi-directional data flow within the fiber 100.

According to embodiments of the present disclosure, the multicore fiber 100 (e.g., as depicted in exemplary form in FIG. 1) possesses various advantages over conventional optical fibers. In one example, a fiber 100 can be configured with four cores to enable 100 Gb/s data rate communications with a linear array of optical ports along the edge of an integrated chip design. In another example, the multicore fiber 100 can be configured to satisfy optical interconnection system requirements including but not limited to: crosstalk ≤−30 dB in a 2 km fiber length; edge loss ≤1 dB/km; and excess coupling loss ≤0.2 dB.

Multicore fiber 100 according to the present disclosure can be configured for both backward and forward compatibility. In terms of backward compatibility, the fiber 100 can be connected to other single core fibers such that the core at position 10 transmits and/or receives light from the core in the single core fiber. In terms of forward compatibility, the fiber 100 can be configured with less than 17 cores (e.g., a close-packed, linear arrangement of five cores as shown in FIG. 1 (positions 8-12)) such that the fiber 100 can be connected to a fiber containing 17 cores (see, e.g., FIG. 1). In such a configuration, the five cores at positions 8-12 in the fiber 100 are aligned and connected to five cores at positions 8-12 in the seventeen-core fiber.

Multicore fiber 100 according to the present disclosure can be configured with a cladding having a 125 micron diameter, which is an industry standard. Accordingly, a multicore fiber 100 with a 125 micron cladding can fit into standard circular ferrule holes found in standard LC- and MTP-type optical connectors. In addition, the inclusion of the angular indication feature (e.g., angular indication 60) in the multicore fiber 100 allows for easy angular alignment of the multicore fiber into a ferrule as a low-cost interconnection.

As shown in FIG. 1, the fiber 100 is depicted in exemplary form with a total of seventeen cores (i.e., plurality of cores 30) in a hexagonally close-packed configuration. The cores 30 are located at positions 1, 3-17 and 19 within the fiber 100. As such, the fiber 100 depicted in FIG. 1 is a 19-core fiber having a total of 17 cores (i.e., plurality of cores 30) occupying 17 of the 19 core positions; consequently, core positions 2 and 18 (not shown) are left unpopulated in fiber 100. By leaving core positions 2 and 18 unpopulated, the fiber 100 exhibits bi-lateral symmetry in terms of its core placement to accommodate bi-directional data flow. For example, core positions 1, 4, 5, 8, 9, 13, 14 and 17 can be employed for optical data flow in one direction within the fiber and core positions 3, 6, 7, 11, 12, 15, 16 and 19 can be employed for optical data flow in the other direction within the fiber. It should also be understood that core position 10 is bisected by the line of symmetry and therefore not used for bi-directional data flow.

Referring again to the exemplary fiber 100 depicted in FIG. 1, the angular indication feature 60 is configured within the cladding edge 52 to facilitate the orientation of the plurality of cores 30 with particular connector pathways and/or the cores in another multicore optical fiber. The angular indication 60 can take on various shapes, provided that the shape is a protrusion or indentation with dimensions sufficient for human or machine detection to ensure azimuthal angle control of the fiber 100 during interconnection procedures or steps. For example, the angular indication 60 depicted in FIG. 1 is shown as a slight depression. As such, the "top" and "bottom" of the fiber can be detected based on the indication 60 and each of the core positions (e.g., core positions 1, 3, 17, 19 and others) have a unique orientation relative to the indication. According to other embodiments, the angular indication 60 possesses one or more flat surfaces on the exterior surfaces of the cladding edge 52. As such, fiber 100 can take the form of a polygonal fiber including but not limited to a square fiber, a rectangular fiber, a hexagonal fiber and fibers having other polygon cross-sectional shapes such that they exhibit an angular indication 60. Preferably, the angular indication 60 is located on or in close proximity to the line of bi-lateral symmetry between the core positions that defines cores designated for data transmission in one direction and cores designated for data transmission in the other direction within the fiber.

According to embodiments of the present disclosure, the multicore fiber 100, the angular indication 60 can be configured in a "D" shape. This form of angular indication 60 is mindful of processing aspects of the fiber 100. During fiber draw processing which melts the fiber, it can be challenging to fashion an angular indication with a straight edge. This is because sharp points round during such processing and straight edges bow outward. In view of these process considerations, the angular indication 60 can be effectively shaped in a "D" form with two rough or rounded "peaks" as depicted in FIG. 1. The two "peaks" of the angular indication 60 can then be mated to a flat surface in a connector for relatively easy alignment. That is, the azimuthal angle in the fiber 100 can be aligned using an angular indication 60 with "peaks" in a "D" shape to ensure proper orientation of each of its cores 30 with the connector. Further, the "D" shape of the angular indication 60 depicted in FIG. 1 can be fabricated from a cladding blank as understood by those in the field of the disclosure. This shape can be easily preserved with little deformation during the fiber draw process. Any deformations that do occur are predictable to ensure the final dimensions of the fiber 100 are controlled. Moreover, even if there is some deformation of the location and height of the "peaks", the angular and lateral reference surface of the indication 60 should still be useable. This is because the two peaks should remain well-registered to the line of bi-lateral symmetry of the cores 30. In addition, aspects of the fiber 100 lack a core 30 in core position 2 (not expressly shown in FIG. 1, but present between core positions 1 and 3); consequently, any deformation associated with the angular indication 60 has substantially no adverse impact on crosstalk or other performance-related attributes of the fiber.

Referring again to FIG. 1, the multicore fiber 100 can exhibit various characteristics indicative of preferred optical interconnect system requirements including crosstalk, edge loss and excess coupling loss demands at an operating wavelength of 1310 nm. With regard to crosstalk, the multicore fiber 100 can have crosstalk ≤−30 dB over a 2 km length of the fiber. That is, the plurality of cores 30 in these multicore fibers 100 experience very limited crosstalk during operation. In addition, the multicore fiber 100 can have crosstalk of ≤−25 dB, ≤−20 dB, ≤−15 dB, and as low as ≤−10 dB over a 2 km fiber length. With regard to edge loss, the multicore fiber 100 can have edge loss of ≤1 dB/km. That is, the outermost cores (e.g., cores as positions 1, 3, 8, 12, 17 and 19) of the plurality of cores 30 exhibit limited edge loss out of the fiber through the cladding edge 52. Embodiments of the fiber 100 can have an edge loss of ≤2 dB/km, or ≤1.5 dB/km, while operating at a wavelength of 1310 nm. In addition, the multicore fiber 100 can have edge loss of ≤0.9 dB/km, ≤0.8 dB/km, ≤0.7 dB/km, ≤0.6 dB/km, ≤0.5 dB/km, ≤0.4 dB/km, ≤0.3 dB/km, ≤0.2 dB/km and ≤0.1 dB/km. With regard to excess coupling loss, the multicore fiber 100 can have an excess coupling loss of ≤0.2 dB. That is, the fiber 100 experiences a limited amount of optical data loss at the interconnection point to another fiber, ferrule or other connector. In addition, the multicore fiber 100 can have an excess coupling loss of ≤0.15 dB, ≤0.12 dB, ≤0.11 dB, ≤0.10 dB, ≤0.09 dB, ≤0.08 dB, ≤0.07 dB, ≤0.06 dB and ≤0.05 dB. It should also be understood that certain embodiments of the multicore fiber 100 possess any one or any combination of the foregoing characteristics.

As also depicted in FIG. 1, the plurality of cores 30 in the multicore fiber 100 can have core center-to-core center spacing 70. The cores 30 in the multicore fiber 100 may have roughly the same diameter and the diameter of the cladding region 50 is also substantially constant. With regard to the core center-to-core center spacing 70, it relates to the distance between the centers of two adjacent cores and defines a minimum separation distance between the cores to such that the fiber 100 attains certain performance characteristics (e.g., crosstalk). The core center-to-core center spacing 70 may be between about 20 microns and about 35 microns. The core center-to-core center spacing 70 may also be between about 20 microns and about 25 microns, or even between about 10 and about 50 microns, and all values therebetween, based at least in part on considerations related to the maximum allowable diameter of the fiber 100 for its intended application(s) and crosstalk requirements.

As further depicted in FIG. 1, the plurality of cores 30 in the multicore fiber 100 can have an outermost core center-to-cladding edge spacing 80. The outermost core center-to-cladding edge spacing 80 relates to the minimum acceptable distance between the center of the outermost cores (e.g., cores at positions 1, 3, 8, 12 17 and 19) to the cladding edge 52. According to embodiments of the present disclosure, the outermost core center-to-cladding edge spacing 80 may be between about 10 microns and about 25 microns. Alternatively, the outermost core center-to-cladding edge spacing 80 may be between about 17.5 microns and about 22.5 microns, or even between about 5.0 and about 50 microns, and all values therebetween, based at least in part on considerations related to the maximum allowable diameter of the fiber 100 for its intended application(s) and edge loss requirements.

The plurality of cores 30 employed in the multicore fiber 100 comprise a silica composition. The cores 30 may comprise silica and an up-dopant. Suitable up-dopants that can be employed in the cores 30 include but are not limited to $GeOL_2$, $Al_2O_3$, and $P_2O_5$, singly or in combination. These up-dopants can be employed at or near the center of the cores 30 to obtain a desired refractive index profile and density within each core. The refractive index profile of fiber 100 may be non-negative from the center of each core 30 to the outer radius of the core. The cores 30 may contain no down-dopants. Preferably, each of the cores 30 contains substantially no fluorine and, more preferably, the cores contain no fluorine.

According to embodiments of the present disclosure, the cores 30 have a refractive index profile that is stepped, parabolic or substantially parabolic in shape given by the alpha parameter, $\alpha_1$. As used herein, "parabolic" includes substantially parabolic-shaped refractive index profiles which may vary slightly from an $\alpha_1$ of about 2.0, for example 1.9, 2.1 or 2.3, at one or more points within each core 30. Each of the cores 30 may comprises an outer core layer with a substantially silica composition. The cores 30 in certain implementations of the fiber 100 (i.e., fibers 100 with a plurality of cores 30 having no outer core layer and fibers 100 with a plurality of cores 30 having an outer core layer) may further include a moat with a substantially silica composition containing a down-dopant.

As also depicted in FIG. 1, the cladding region 50 in the multicore fiber 100 comprises a silica composition. According to embodiments of the present disclosure, the cladding region 50 of the fiber 100 may comprise a silica composition with at least one down-dopant (e.g., fluorine). The down-dopant can be present at a substantially uniform concentration throughout the cladding region 50. Alternatively, the down-dopant can be present at non-uniform concentrations within the cladding region 50. As such, no or substantially no down-dopants can exist in one or more portions of the cladding region 50.

With further regard to the cladding region 50 of the multicore fiber 100 depicted in FIG. 1, its outer diameter can be set based on the application requirements for the multicore fiber 100. The outer diameter of the cladding region 50 may be between about 100 microns and about 150 microns. Preferably, the outer diameter of the cladding region 50 may be about 125 microns, a standard optical fiber diameter employed in the industry. According to embodiments of the present disclosure, the outer diameter of the cladding region 50 may be based at least in part on one or more of the core center-to-core center spacing 70, outermost core center-to-cladding edge spacing 80, edge loss, crosstalk and coupling loss requirements.

According to embodiments of the present disclosure, the fiber 100 includes seventeen cores (i.e., the plurality of cores 30) arranged in a hexagonally close-packed configuration. Each of the cores 30 has a core center and comprises silica and an up-dopant. Further, a cladding region 50 surrounds the seventeen cores 30, the cladding region 50 having a cladding edge 52, an outer diameter, and a cladding composition comprising silica. The outer diameter of the cladding region 50 is between about 100 microns and 150 microns. Further, the hexagonally close-packed configuration has bi-lateral symmetry to accommodate bi-directional data flow within the multicore fiber 100. The cladding edge 52 according to embodiments of the present disclosure may include an angular indication feature 60 configured to facilitate alignment of a connector to the fiber.

According to embodiments of the present disclosure, cores 30 at positions 1, 4, 5, 8, 9, 13, 14 and 17 can transmit data in one direction within the fiber; and cores 30 at positions 3, 6, 7, 11, 12, 15, 16 and 19 can transmit data in the opposite direction within the fiber. Further, the core 30 at position 10 in the center of fiber 100 can be unused under nominal operation of the fiber 100. The core 30 at position 10 can also be employed to transmit data when fiber 100 is coupled to a single core fiber to ensure that fiber 100 has backward compatibility with single core fibers.

As depicted in FIGS. 1A-1E, the plurality of cores 30 can be configured such that 5, 8, 9, 13 or 16 of the cores 30 are present in a close-packed configuration with bi-lateral core symmetry that can accommodate bi-direction data flow capability. In particular, the multicore fiber 100 having 9, 13 or 16 cores 30 can be configured with the plurality of cores 30 in a hexagonally close-packed core configuration.

Figure 1A:
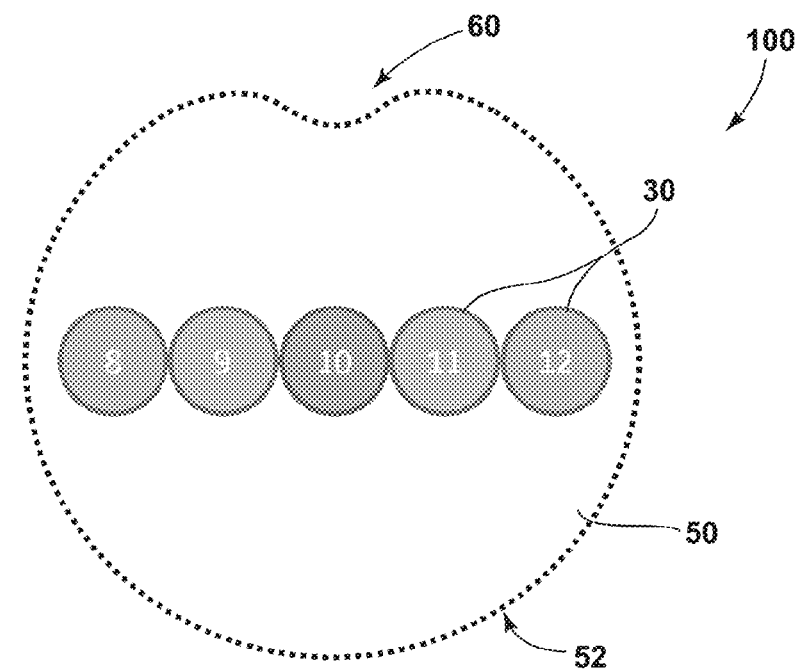
FIG. 1A is a cross-sectional schematic of a multicore, five-core optical fiber according to an embodiment of the disclosure.

The multicore fiber 100 depicted in FIG. 1A includes 5 cores located at core positions 8-12. Cores 30 at positions 8 and 9 can transmit data in one direction within the fiber 100; and cores 30 at positions 11 and 12 can transmit data in the opposite direction within the fiber 100. The core 30 at position 10 in the center of fiber 100 can be unused under nominal operation of the fiber 100 depicted in FIG. 1A. The core 30 at position 10 can also be employed to transmit data when fiber 100 is coupled to a single core fiber to ensure that fiber 100 has backward compatibility with single core fibers. On the other hand, the multicore fiber 100 having 5 cores 30 also has forward compatibility with a 17-core (e.g., a 17-core multicore fiber 100 as described herein) coupled to it.

Figure 1B:
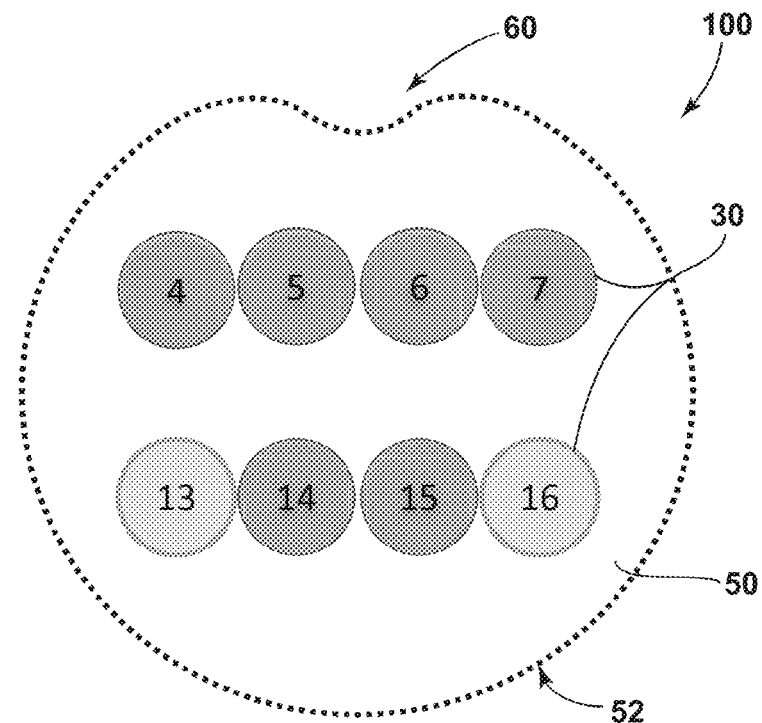
FIG. 1B is a cross-sectional schematic of a multicore, eight-core optical fiber according to an embodiment of the disclosure.

The multicore fiber 100 depicted in FIG. 1B includes 8 cores located at core positions 4-7 and 13-16. Cores 30 at positions 4, 5, 13 and 14 can transmit data in one direction within the fiber 100; and cores 30 at positions 6, 7, 15 and 16 can transmit data in the opposite direction within the fiber 100. It should be understood that other permutations are possible, insofar as each core on one side of the line of bi-lateral symmetry can have a complementary core on the opposite side carrying light in the opposite direction. Further, the multicore fiber 100 having 8 cores 30 depicted in FIG. 1B has forward compatibility with a 17-core (e.g., a 17-core multicore fiber 100 as described herein) coupled to it.

Figure 1C:
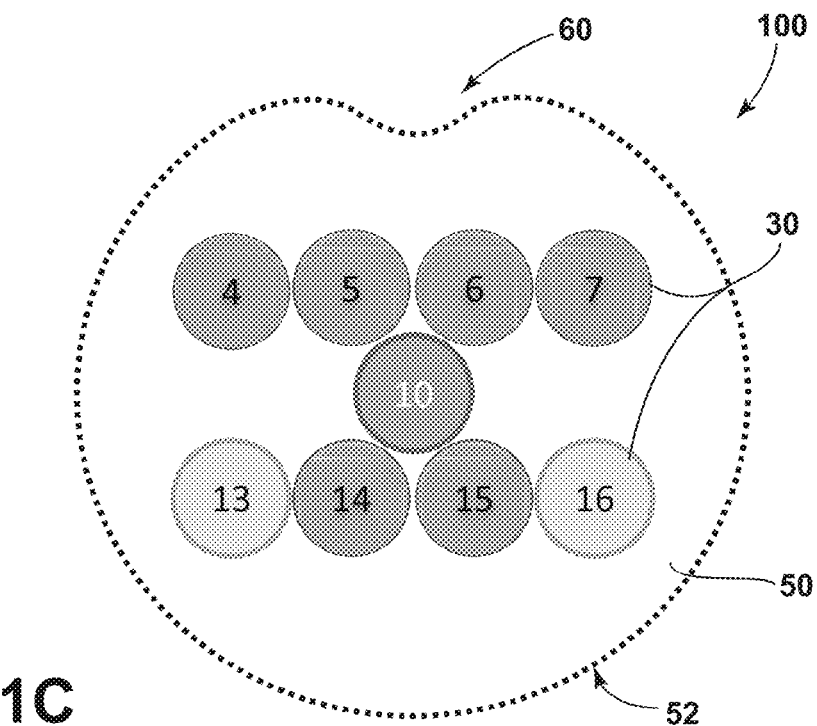
FIG. 1C is a cross-sectional schematic of a multicore, nine-core optical fiber according to an embodiment of the disclosure.

The multicore fiber 100 depicted in FIG. 1C includes 9 cores located at core positions 4-7, 10 and 13-16. Cores 30 at positions 4, 5, 13 and 14 can transmit data in one direction within the fiber 100; and cores 30 at positions 6, 7, 15 and 16 can transmit data in the opposite direction within the fiber 100. The core 30 at position 10 in the center of fiber 100 can be unused under nominal operation of the fiber 100 depicted in FIG. 1C. The core 30 at position 10 can also be employed to transmit data when fiber 100 is coupled to a single core fiber to ensure that fiber 100 has backward compatibility with single core fibers. Further, the multicore fiber 100 having 9 cores 30 depicted in FIG. 1C has forward compatibility with a 17-core (e.g., a 17-core multicore fiber 100 as described herein) coupled to it.

Figure 1D:
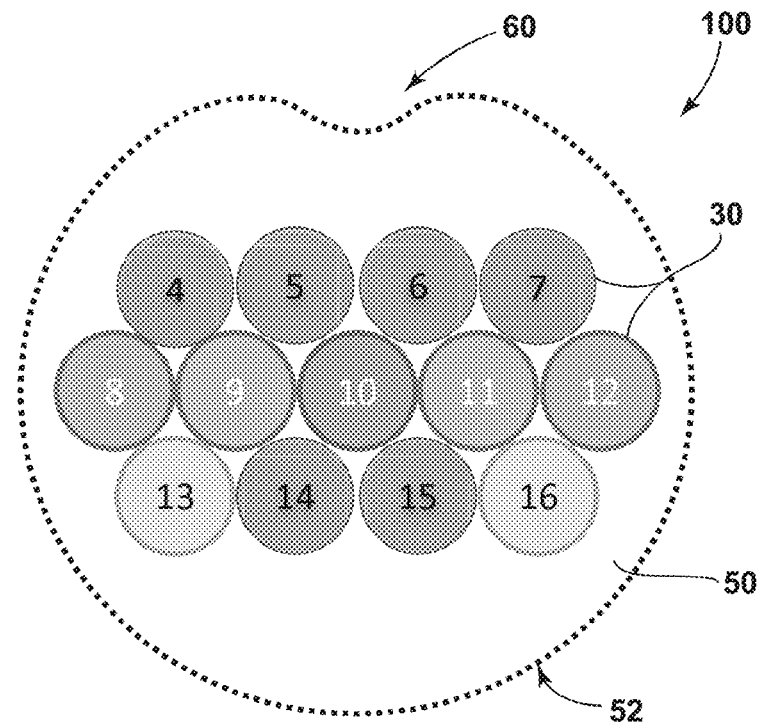
FIG. 1D is a cross-sectional schematic of a multicore, thirteen-core optical fiber according to an embodiment of the disclosure.

The multicore fiber 100 depicted in FIG. 1D includes 13 cores located at core positions 4-16. Cores 30 at positions 4, 5, 8, 9, 13 and 14 can transmit data in one direction within the fiber 100; and cores 30 at positions 6, 7, 11, 12, 15 and 16 can transmit data in the opposite direction within the fiber 100. The core 30 at position 10 in the center of fiber 100 can be unused under nominal operation of the fiber 100 depicted in FIG. 1D. The core 30 at position 10 can also be employed to transmit data when fiber 100 is coupled to a single-core fiber to ensure that fiber 100 has backward compatibility with single-core fibers. It is also backwardly compatible with a five-core (e.g., fiber 100 depicted in FIG. 1A) and an eight-core fiber having a 2×4 array of cores (e.g., fiber 100 depicted in FIG. 1B). Further, the multicore fiber 100 having 13 cores 30 depicted in FIG. 1D has forward compatibility with a 17-core (e.g., a 17-core multicore fiber 100 as described herein) coupled to it.

Figure 1E:
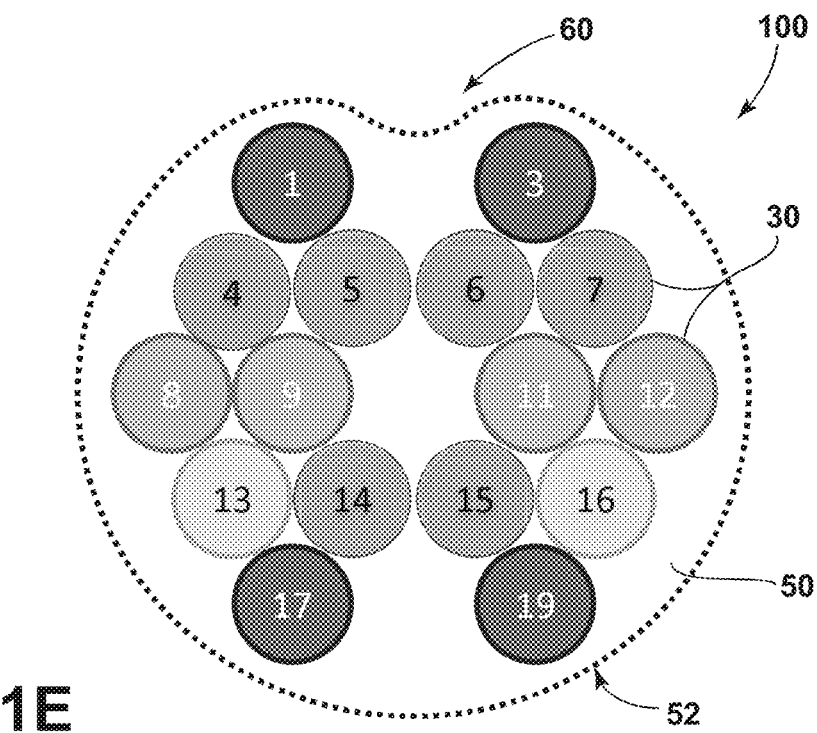
FIG. 1E is a cross-sectional schematic of a multicore, sixteen-core optical fiber according to an embodiment of the disclosure.

The multicore fiber 100 depicted in FIG. 1E includes 16 cores located at core positions 1, 3-9, 11-17 and 19. Cores 30 at positions 1, 4, 5, 8, 9, 13, 14 and 17 can transmit data in one direction within the fiber 100; and cores 30 at positions 3, 6, 7, 11, 12, 15, 16 and 19 can transmit data in the opposite direction within the fiber 100. Further, the multicore fiber 100 having 16 cores 30 depicted in FIG. 1E has forward compatibility with a 17-core (e.g., a 17-core multicore fiber 100 as described herein) coupled to it.

Figure 2:
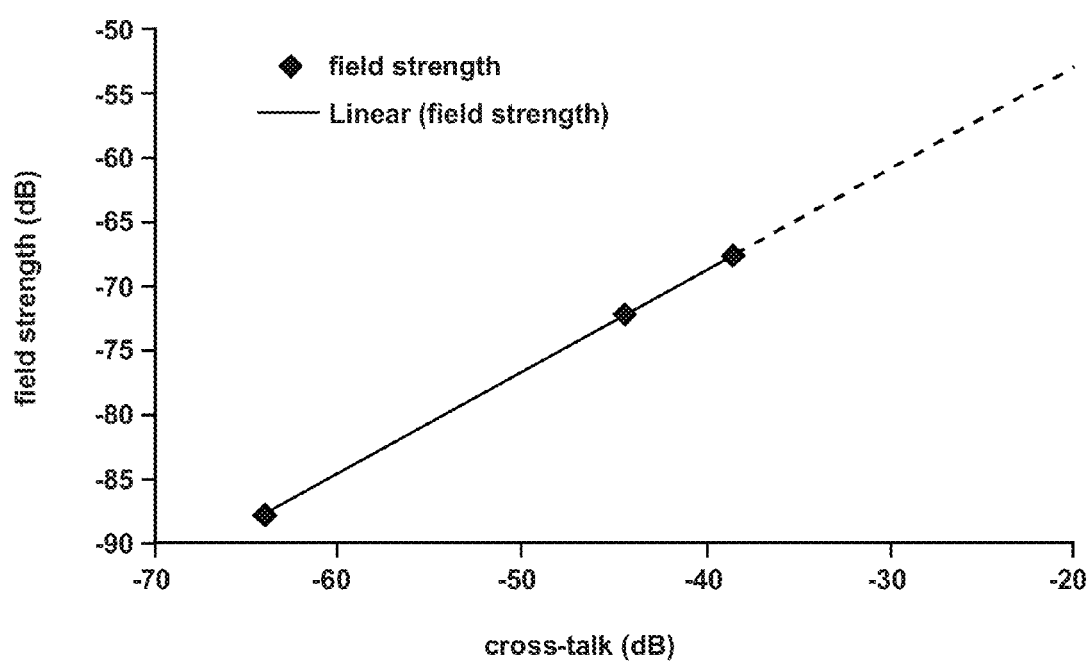
FIG. 2 depicts a plot of field strength vs. cross-talk in a victim core placed at a radial distance of about 47 microns from a core carrying a signal in a multicore, seventeen-core optical fiber according to an embodiment of the disclosure.

As outlined earlier, the multicore fiber 100 can exhibit various characteristics indicative of preferred optical interconnect system requirements including crosstalk (e.g., ≤30 dB in a 2 km fiber length), edge loss (e.g., ≤1 dB/km) and excess coupling loss (e.g., ≤0.2 dB) demands at an operating wavelength of 1310 nm. According to embodiments of the present disclosure, the crosstalk parameter determines the minimum separation for a pair of cores—i.e., the core center-to-core center spacing 70. In an implementation of the fiber 100, crosstalk was measured at 1310, 1490 and 1550 nm on a 200 m length of a multicore optical fiber in which a "victim" core was placed 47 microns away from a particular core in the fiber carrying a data signal. Since the crosstalk scales linearly with fiber length, the values measured were scaled to simulate the expected crosstalk in a 2 km fiber length. As the cores in this multicore fiber on test were essentially the same as Corning® SMF-28® cores in terms of composition and dimensions, the field amplitude of the signal core at the location of the "victim" core could be calculated. As depicted in FIG. 2, a linear relationship was found between this field amplitude (dB) and the crosstalk (dB). Extrapolating this linear relationship, it is evident that the field amplitude is ~−61 dB when the crosstalk is ~−30 dB. With the recognition of this correlation of field amplitude to crosstalk, the −61 dB field amplitude can be employed to develop various core designs in terms of core center-to-core center spacing 70 suitable for use in the multimode fiber 100.

In Table 1 below, an acceptable minimum core center-to-core center spacing 70 was calculated using the foregoing approach (see also FIG. 2) for the plurality of cores corresponding to four core configurations of the multicore fiber 100. In particular, each of the plurality of cores 30 was configured according to: (a) Corning® SMF-28®; (b) Corning® SMF-28® with a moat containing a fluorine down-dopant; (c) 0.6% Δ stepped-index core; and (d) 0.6% Δ stepped-index core with a moat containing a fluorine down-dopant. For the core designs (b) and (d), the moat has a negative 0.6% Δ and an inner radius of 10 microns and 8 microns, respectively. In addition, the fibers 100 with the (a) and (b) core designs have 0 dB coupling loss and the fibers 100 with the (c) and (d) core designs have a coupling loss of 0.2 dB.

TABLE ONE

| Multicore fiber design | Core center-to-core center spacing |
|---|---|
| (a) Corning ® SMF-28 ® | 32.8 microns |
| (b) Corning ® SMF-28 ® with moat | 26.3 microns |
| (c) 0.6% Δ stepped-index core | 26.1 microns |
| (d) 0.6% Δ stepped-index core with moat | 21.6 microns |

Similarly, empirical data was developed using the foregoing approach (see also FIG. 2) to determine acceptable outermost core center-to-cladding edge spacing 80 to ensure an acceptable edge loss of ≤1 dB/km. The measured edge loss levels for two multicore fibers, one with a loss higher than the 1 dB/km required level and the other with a lower loss than the 1 dB/km required level, were used to interpolate the integrated field amplitude (dB) beyond the cladding edge 52 corresponding to an edge loss of 1 dB/km. Table 2 below lists an acceptable minimum outermost core center-to-cladding edge spacing 80 for the same designs of fiber 100 contained in Table 1.

TABLE TWO

| Multicore fiber design | Outermost core center-to-cladding edge spacing |
|---|---|
| (a) Corning ® SMF-28 ® | 23.9 microns |
| (b) Corning ® SMF-28 ® with moat | 15.1 microns |
| (c) 0.6% Δ stepped-index core | 18.5 microns |
| (d) 0.6% Δ stepped-index core with moat | 13.7 microns |

In view of the results in Tables 1 and 2, various core configurations can be employed in a multicore fiber 100 according to the disclosure to achieve crosstalk, edge loss and excess coupling loss demands at an operating wavelength of 1310 nm. In one example, a five-core configuration (see FIG. 1A and the corresponding description in the specification) can be configured with a cladding diameter of 125 microns with each core possessing a (d) configuration—i.e., 0.6% Δ stepped-index core with a moat. In this case, the cladding outer diameter can be low as 114 microns (i.e., 4×21.6 microns core center-to-core center spacing (86.4 microns)+2×13.7 microns (27.4 microns) outermost core center-to-cladding edge spacing=113.8 microns).

Figure 3A:
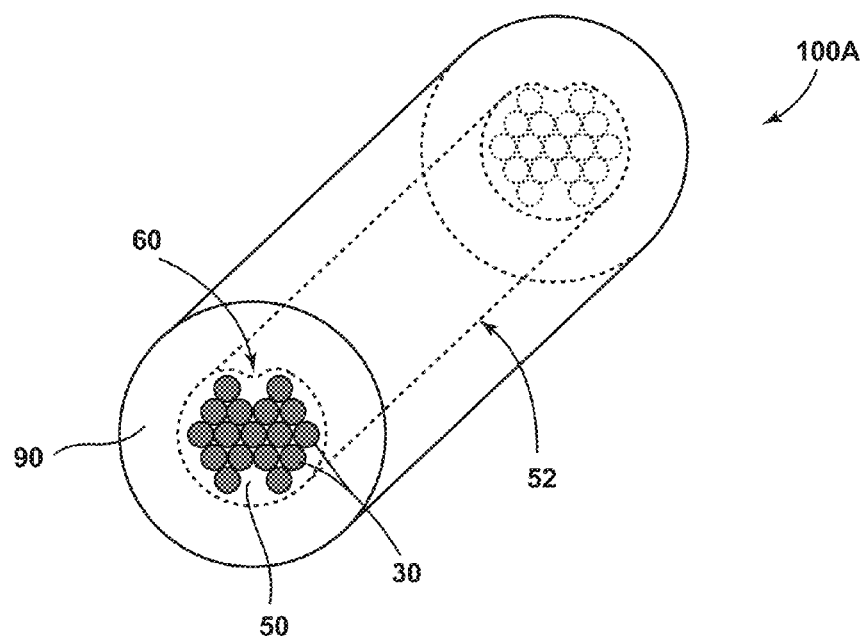
FIG. 3A is a perspective view schematic of a multicore, seventeen-core optical fiber with an angular indication according to an embodiment of the disclosure.
Figure 3B:
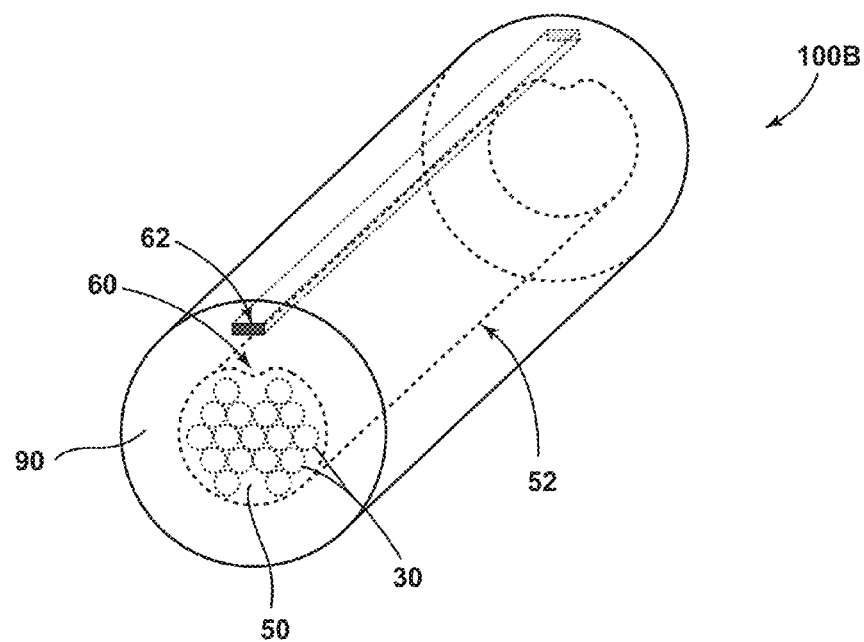
FIG. 3B is a perspective view schematic of a multicore, seventeen-core optical fiber with an angular indication and a fiber coating marking according to an embodiment of the disclosure.
Figure 3C:
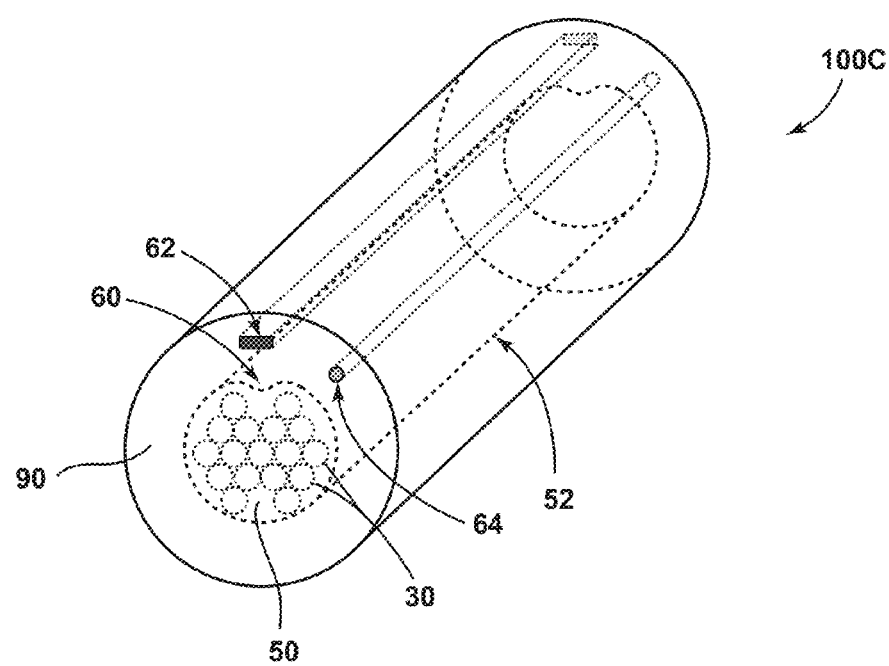
FIG. 3C is a perspective view schematic of a multicore, seventeen-core optical fiber with an angular indication and dual fiber coating markings according to an embodiment of the disclosure.

As shown in FIGS. 3A-3C, various configurations of a multicore fiber 100A are depicted. These fibers are comparable to the fibers 100 depicted in FIGS. 1 and 1A-1E; however, the fibers 100A also include a fiber coating 90 added to the cladding outer edge 52 for handling purposes. FIG. 3A provides a schematic of a multicore, seventeen-core optical fiber 100A with an angular indication 60 and a fiber coating 90 according to an embodiment of the present disclosure. The angular indication 60 in the fiber 100A depicted in FIG. 3A can be employed to effectively align the cores 30 of the fiber to a connector and/or ferrule in an optical fiber system. FIG. 3B provides a schematic of a multicore, seventeen-core optical fiber 100A with an angular indication 60 and a fiber coating marking 62 according to an embodiment of the present disclosure. Here, the angular indication 60 in the fiber 100A and the marking 62 can be employed to effectively align the cores 30 of the fiber to a connector and/or ferrule in an optical fiber system. The marking 62 can assist in giving technicians a visual reference as to the proper orientation of the cores in the fiber 100A. Finally, FIG. 3C provides a schematic of a multicore, seventeen-core optical fiber 100A with an angular indication 60 and dual fiber coating markings 62, 64 according to a an embodiment of the present disclosure. In this scenario, the angular indication 60 in the fiber 100A and the markings 62, 64 can be employed to effectively align the cores 30 of the fiber to a connector and/or ferrule in an optical fiber system. Here, the second marking 64 can be placed in the fiber coating 90 asymmetrically with respect to the plane of symmetry defined by the cores to ensure that a technician can recognize whether the particular fiber 100A is coming from the left or the right. More generally, the markings 62, 64, as employed in a fiber 100A, can take on any of a variety of shapes and sizes within the fiber coating 90 to provide a visual point of reference as to the orientation of the cores 30 in the fiber.

Figure 4:
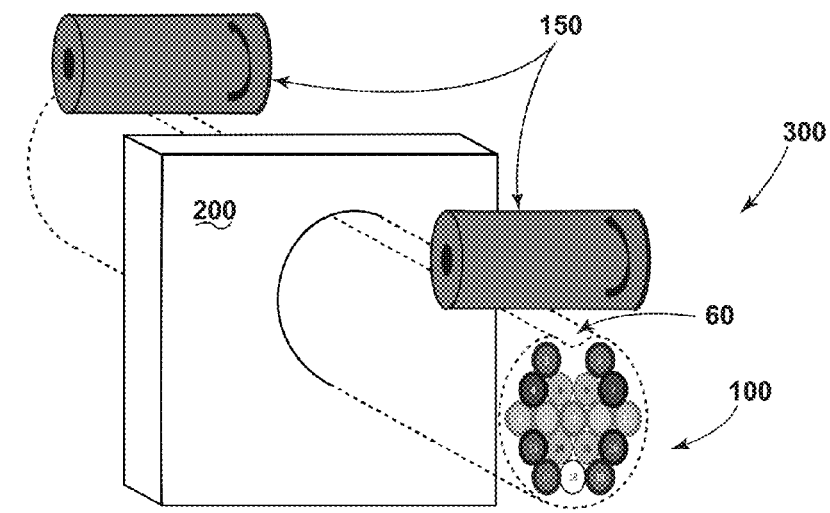
FIG. 4 is a perspective view schematic of a multicore optical fiber and ferrule alignment apparatus according to an embodiment of the disclosure.

Referring to FIG. 4, a multicore optical fiber and ferrule alignment apparatus 300 is provided according to an embodiment of the present disclosure. In particular, the apparatus 300 can be employed to properly align a multicore fiber 100 (or a multicore fiber 100A) to a ferrule 200. It should be understood that the multicore fiber 100A has had its coating 90 removed, at least in proximity to the ferrule 200 and rollers 150. Rollers 150 or other suitable components coupled directly or indirectly to the ferrule 200 are employed to orient the azimuthal angle of the fiber 100 with respect to the ferrule 200. Advantageously, the ferrule 200 is a standard, low-cost ferrule employed in the field and the apparatus 300 relies on its rollers 150 (or other suitable apparatus) to detect the angular indication 60 of the fiber 100 to orient it relative to the ferrule. Such rollers 150 can also make use of any fiber coating markings 62 and/or 64 present in the fiber (applicable to fibers 100A, not shown in FIG. 4).

More particular, the apparatus 300 depicted in FIG. 4 can be employed to orient a 17-core multicore fiber 100 having an approximate 125 micron cladding diameter to a ferrule. Here, the X and Y (lateral) positioning of the fiber 100 into a hole in the ferrule 200 can be accomplished by using standard techniques and apparatus known in the field. The apparatus 300 can provide accurate alignment of the azimuthal angle of the fiber 100 to the coordinate system of the ferrule 200. Without being bound by theory, the apparatus 300 can employ its rollers 150 to bring the multicore fiber 100 within a few tenths of a degree of the ideal orientation for the fiber with respect to the ferrule 200. As shown in FIG. 4, rollers 150 can be placed in front of and behind ferrule 200 for this purpose.

Figures 5A, 5B:
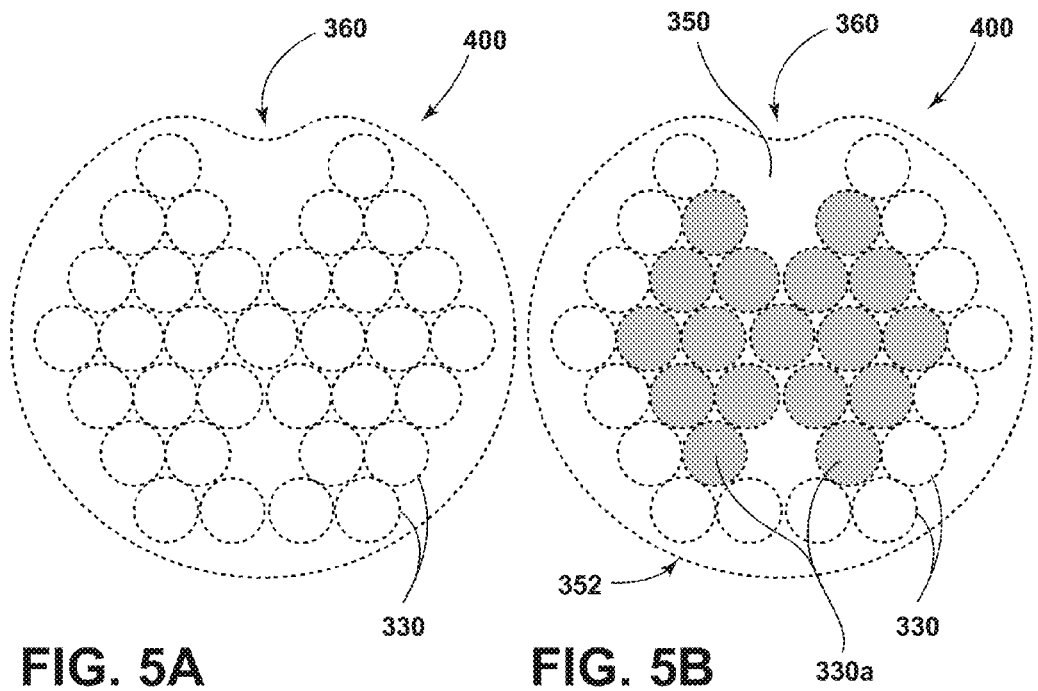
FIGS. 5A and 5B are cross-sectional schematics of a multicore, thirty-three-core optical fiber having seventeen cores that are spatially compatible with the multicore optical fiber depicted in FIG. 1A according to an embodiment of the disclosure.

Referring to FIGS. 5A & 5B, cross-sectional schematics of a multicore, thirty-three-core optical fiber 400 are provided. In particular, the multicore fiber 400 contains thirty-three cores 330 configured in a hexagonal, close-packed arrangement such that seventeen of its cores 330a (see FIG. 5B) are spatially compatible with the plurality of cores 30 in a multicore optical fiber 100 depicted in FIG. 1A according to an embodiment of the present disclosure. As also shown in FIGS. 5A and 5B, the fiber 400 also contains a cladding region 350, angular indication feature 360, and other features comparable in configuration to like elements of the multicore fiber 100. Moreover, certain of the cores 330a of the multicore fiber 400 are spatially compatible with the cores 30 of the various multicore fibers depicted in FIGS. 1A-1E. As a result, embodiments of the present disclosure associated with multicore fibers can be extended past a seventeen core arrangement to higher-density core permutations—i.e., 33 cores (see multicore fiber 400 shown in FIGS. 5A & 5B), 65 cores, 129 cores, and others capable of hexagonal close-packing and backwardly compatible with other multicore designs (e.g., 17 core designs).

It will be apparent to those skilled in the art that various modifications and variations can be made to the multicore optical fibers and the methods of interconnecting them disclosed herein within the foregoing without departing from the spirit and scope of the disclosure.

What is claimed is:

1. A multicore optical fiber, comprising:
    seventeen cores arranged in a hexagonally close-packed configuration, each core having a core center and comprising silica and an up-dopant; and
    a cladding region surrounding the seventeen cores, the cladding region having a cladding edge, an outer diameter, and a cladding composition comprising silica,
    wherein the outer diameter of the cladding region is between about 100 microns and 150 microns,
    wherein the hexagonally close-packed configuration has bi-lateral symmetry to accommodate bi-directional data flow within the fiber, and
    further wherein a core center-to-core center spacing for the seventeen cores is between about 20 microns and about 25 microns and an outermost core center-to-cladding edge spacing is between about 17.5 and about 22.5 microns.

2. The fiber according to claim 1, wherein the fiber operating at a wavelength of 1310 nm has a crosstalk of ≤30 dB over a 2 km length of the fiber, an edge loss of ≤1 dB/km of fiber length and a coupling loss of ≤0.2 dB.

3. The fiber according to claim 1, wherein each core further comprises a step-shaped refractive index profile.

4. The fiber according to claim 1, wherein each core further comprises an outer core layer having a substantially pure silica composition and the cladding composition further comprises a down-dopant.

5. The fiber according to claim 1, wherein the cladding edge comprises an angular indication feature, the indication feature being aligned to a line of bi-lateral symmetry between the cores and being configured to facilitate alignment of a connector to the fiber.

6. A multicore optical fiber, comprising:
    a plurality of cores having a close-packed configuration, each core having a core center and comprising silica and an up-dopant; and
    a cladding region surrounding the plurality of cores, the cladding region having a cladding edge, an outer diameter and a cladding composition comprising silica,
    wherein the cladding edge comprises an angular indication feature, the indication feature being aligned to a line of bi-lateral symmetry between the cores and being configured to facilitate alignment of a connector to the fiber, and further wherein the close-packed configuration has bilateral core symmetry to accommodate bi-directional data flow within the fiber.

7. The fiber according to claim 6, wherein the plurality of cores is selected from the group consisting of 5, 8, 9, 13, 16 and 17 cores.

8. The fiber according to claim 6, wherein the plurality of cores is selected from the group consisting of 13, 16 and 17 cores, and the close-packed configuration is hexagonal.

9. The fiber according to claim 6, wherein the fiber operating at a wavelength of 1310 nm has a crosstalk of ≤30 dB over a 2 km length of the fiber, an edge loss of ≤1 dB/km of fiber length and a coupling loss of ≤0.2 dB.

10. The fiber according to claim 6, wherein a core center-to-core center spacing for the plurality of cores is between about 20 microns and 35 microns and an outermost core center-to-cladding edge spacing is between about 10 and 25 microns.

11. The fiber according to claim 6, wherein a core center-to-core center spacing for the plurality of cores is between about 20 microns and 25 microns and an outermost core center-to-cladding edge spacing is between about 17.5 and 22.5 microns.

12. The fiber according to claim 6, wherein each core further comprises a graded refractive index profile.

13. The fiber according to claim 12, wherein each core further comprises a moat having a moat composition comprising silica and a down-dopant.

14. The fiber according to claim 6, wherein each core further comprises a step-shaped refractive index profile.

15. The fiber according to claim 6, wherein each core further comprises an outer core layer having a substantially pure silica composition and the cladding composition further comprises a down-dopant.

16. The fiber according to claim 6, wherein the cladding edge is substantially round and the angular indication feature is a protrusion or indentation within the cladding edge and comprises at least one flat or curved feature.

17. The fiber according to claim 1, wherein each core further comprises a graded refractive index profile.

18. The fiber according to claim 17, wherein each core further comprises a moat having a moat composition comprising silica and a down-dopant.

* * * * *

UNITED STATES PATENT AND TRADEMARK OFFICE
CERTIFICATE OF CORRECTION

PATENT NO. : 10,001,597 B2
APPLICATION NO. : 15/253066
DATED : June 19, 2018
INVENTOR(S) : Kevin Wallace Bennett et al.

It is certified that error appears in the above-identified patent and that said Letters Patent is hereby corrected as shown below:

On the Title Page

Page 2, Column 2, item [56], Line 8, delete "Mulitcore" and insert -- Multicore --, therefor.

Signed and Sealed this
Twenty-sixth Day of May, 2020

Andrei Iancu
*Director of the United States Patent and Trademark Office*